US006680732B2

(12) United States Patent
Yoo

(10) Patent No.: US 6,680,732 B2
(45) Date of Patent: Jan. 20, 2004

(54) APPARATUS AND METHOD FOR ATTENUATING LUMINANCE OF PLASMA DISPLAY PANEL

(75) Inventor: Hyo-nam Yoo, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/280,092

(22) Filed: Oct. 25, 2002

(65) Prior Publication Data

US 2003/0090488 A1 May 15, 2003

(30) Foreign Application Priority Data

Nov. 14, 2001 (KR) ........................................ 2001-70730

(51) Int. Cl.[7] ................................................ G02B 27/02
(52) U.S. Cl. .............................. 345/173; 345/63; 345/8
(58) Field of Search ........................... 315/169.1–169.4; 345/63, 8, 9, 135, 139, 87, 102, 104, 173

(56) References Cited

U.S. PATENT DOCUMENTS 5,717,415 A * 2/1998 Iue et al. ....................... 345/8
6,279,253 B1 * 8/2001 Inbar et al. ................. 345/173

* cited by examiner

*Primary Examiner*—Wilson Lee
(74) *Attorney, Agent, or Firm*—Sughrue Mion, PLLC

(57) ABSTRACT

An apparatus and method for attenuating luminance of a plasma display panel (PDP) to prevent degradation of picture quality on a local area and an increase in power consumption are provided. The apparatus includes a motion detection unit for detecting whether input data has motion, a duration check unit for checking a duration time for which the input data has no motion when the input data is detected as having no motion in the motion detection unit, an attenuation constant generator for generating an attenuation constant corresponding to a luminance level of the input data when the input data continuously has no motion for at least a predetermined period of time, and a level attenuation unit for attenuating the luminance level of the input data using the attenuation constant generated from the attenuation constant generator. Accordingly, degradation of picture quality on a local area, which does not influence an average luminance level for a frame, and an increase in power consumption due to the degradation can be prevented.

11 Claims, 4 Drawing Sheets

APPARATUS AND METHOD FOR ATTENUATING LUMINANCE OF PLASMA DISPLAY PANEL

BACKGROUND OF THE INVENTION

1. Field of the Invention

The present invention relates to an apparatus and method for attenuating luminance of a plasma display panel (PDP), and more particularly, to an apparatus and method for attenuating luminance of a PDP, through which degradation of picture quality can be prevented and power consumption can be reduced. The present application is based on Korean Patent Application No. 2001-70730, which is incorporated herein by reference.

2. Description of the Related Art

PDPs employ time sharing to display gray scales. In other words, a single frame is divided into a plurality of sub-fields, and a luminescent period (or a sustain discharge period) is adjusted for each of the sub-fields to display gray scales. When a video signal having a high-luminance component is continuously displayed on a PDP, picture quality is degraded, the life of the PDP is reduced, and power consumption increases.

In order to extend the life of panels and reduce power consumption, conventionally, an apparatus for automatically attenuating the luminance level of an image according to an input level is provided for PDPs.

FIG. 1 is a block diagram of a conventional apparatus for attenuating luminance which is provided for a PDP. Referring to FIG. 1, if RGB data having a linear characteristic is input, a frame average detector 110 including an adder 111 and a divider 112 detects an average luminance level of a current frame. More specifically, if RGB data is input, the adder 111 adds luminance levels of individual pixels to calculate the sum of luminance levels for a current frame. The divider 112 divides the sum of luminance levels calculated by the adder 111 by the number of pixels to calculate an average luminance level for the current frame. The number of pixels is the number of pixels constituting the current frame.

A sustain controller 120 determines the number of sustain pulses during the sustain period for the current frame according to the average luminance level calculated by the divider 112 and provides the determined number of sustain pulses to a PDP driver (not shown). The PDP driver includes an XY controller and a sub-field generator and adjusts the luminance level of an image displayed on the PDP according to the number of sustain pulses. The luminance of an image is proportional to the number of sustain pulses. Accordingly, the sustain controller 120 compares the average luminance level with a predetermined reference value. If it is determined that the average luminance level exceeds the reference value, the sustain controller 120 determines the number of sustain pulses, which will be generated, to be less than the number of sustain pulses which is set previously, and provides the determined number of sustain pulses to the PDP driver so that the luminance level of the image can be attenuated.

In order to compensate for a drawback that a large amount of calculation is required to add luminance levels of all of pixels included in an input frame, there has been provided a method of sampling luminance levels at proper intervals to calculate an average luminance level for a frame.

As described above, a conventional apparatus for attenuating luminance uses the number of sustain pulses that is determined based on an average luminance level calculated for each of frames. Accordingly, when an area that is too small to significantly influence an average luminance level for a frame has a high luminance level, the high luminance level of the small area cannot be lowered satisfactorily. Particularly, when a calculated average luminance level is low, as shown in FIG. 2, the luminance level of a small circular area 201 is rarely attenuated. In this situation, if the same pattern is continuously displayed on the small area 201 for a long period of time, picture quality on the small area 201 is degraded more quickly than on other areas.

SUMMARY OF THE INVENTION

To solve the above-described problems, it is an object of the present invention to provide an apparatus and method for attenuating luminance to prevent degradation of picture quality on a local area and excessive power consumption.

Accordingly, to achieve the object of the present invention, there is provided an apparatus for attenuating luminance of a displayed image. The apparatus includes a motion detection unit for detecting whether input data has motion, a duration check unit for checking a duration time for which the input data has no motion when the input data is detected as having no motion in the motion detection unit, an attenuation constant generator for generating an attenuation constant corresponding to a luminance level of the input data when the input data continuously has no motion for at least a predetermined period of time, and a level attenuation unit for attenuating the luminance level of the input data using the attenuation constant generated from the attenuation constant generator.

Preferably, the motion detection unit includes a memory for storing the input data in units of frames, an adder for detecting a difference between data provided from the memory and the input data, and a comparator for comparing the difference with a predetermined threshold value to detect whether the input data has motion.

Preferably, the duration check unit includes a timer which operates in response to a signal indicating the input data has no motion, and a comparator for comparing time information generated depending on the operation of the timer with a predetermined threshold value to determine whether the input data continuously has no motion for at least the predetermined period of time.

Preferably, the attenuation constant generator includes a level detector for detecting the luminance level of the input data, and a look-up table for storing a plurality of attenuation constants and providing an attenuation constant corresponding to the luminance level.

Preferably, the level attenuation unit includes a delay unit for delaying the input data; and a multiplier for multiplying the input data, which has been delayed by the delay unit, by the attenuation constant and outputting the data having an attenuated luminance level.

There is also provided a method for attenuating luminance of a displayed image. The method includes detecting a luminance level of input data; comparing a previous frame with a current frame in units of pixels or predetermined blocks; if a pixel unit or predetermined block unit image is determined as a still image, checking a duration time for which the pixel unit or predetermined block unit image is continued in a still image state; if the duration time is at least a predetermined period of time, determining an attenuation constant corresponding to the luminance level of the input data; and attenuating the luminance level of the input data using the attenuation constant.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 3:
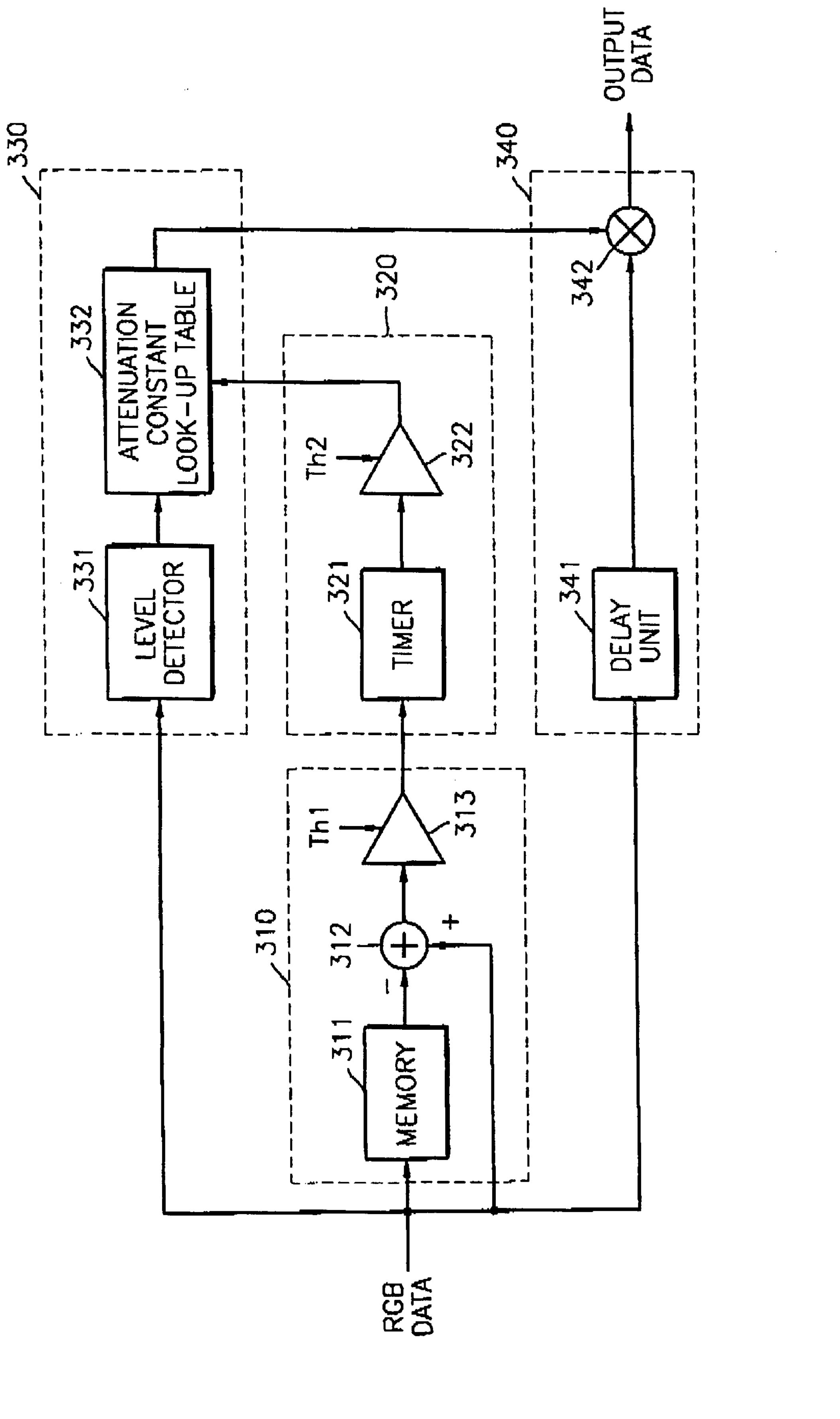
FIG. 3 is a block diagram of an apparatus for attenuating luminance according to a preferred embodiment of the present invention.

Referring to FIG. 3, an apparatus for attenuating luminance according to a preferred embodiment of the present invention includes a motion detection unit 310, a duration check unit 320, an attenuation constant generator 330, and a level attenuation unit 340.

The motion detection unit 310 includes a memory 311, an adder 312, and a comparator 313 and detects a portion having no motion from a currently input frame.

More specifically, the memory 311 stores data of one frame composed of RGB data having a linear characteristic. The adder 312 detects a difference between currently input RGB data and the RGB data output from the memory 311. The RGB data output from the memory 311 is the RGB data of the previous frame. Motion detection may be performed in units of pixels or blocks having a size of N×N. When motion detection is performed in units of pixels, the adder 312 detects a difference in RGB data between two corresponding pixels. When motion detection is performed in units of blocks, the adder 312 detects a difference in an average luminance level between two corresponding blocks. Accordingly, when motion detection is performed in block units, a functional unit for detecting an average luminance level for each block is further provided prior to an input terminal of the adder 312. In other words, a functional unit for detecting an average luminance level for each block and a memory are further provided between the memory 311 and the adder 312 and between a line through which current RGB data is input and the adder 312. The adder 312 transmits a difference between the current RGB data and the previous RGB data output from the memory 311 to the comparator 313.

The comparator 313 compares the difference received from the adder 312 with a threshold value Th1. The threshold value Th1 is previously set taking into account noise. When the difference is less than the threshold value Th1, the comparator 313 determines a relevant pixel or block as a still-image pixel or block having no motion and outputs a signal corresponding to the determination to the duration check unit 320.

The duration check unit 320 includes a timer 321 and a comparator 322 and operates the timer 321 when a signal indicating a still image is applied thereto. Accordingly, the signal indicating a still image output from the motion detection unit 310 is an enable signal for the timer 321.

The timer 321 operates in response to the signal indicating a still image and provides time information generated depending on the operation to the comparator 322. When the timer 321 receives a signal indicating a dynamic image having a motion from the motion detection unit 310, it is initialized. The comparator 322 compares the time information transmitted from the timer 321 with a threshold value Th2. If it is determined that the time information exceeds the threshold Th2, the comparator 322 generates a signal for enabling an operation for obtaining an attenuation constant and transmits the signal to the attenuation constant generator 330. Taking into account a period of time for which the same pattern is continuously displayed on the panel resulting in degradation of picture quality, the threshold value Th2 is set in advance.

The attenuation constant generator 330 includes a level detector 331 and an attenuation constant look-up table 332 and generates an attenuation constant corresponding to a luminance level of the input RGB data. In other words, the level detector 331 detects the luminance level of the input RGB data. One of existing methods of detecting a luminance level of an image signal is used. If the attenuation constant look-up table 332 receives the signal enabling the operation for generating an attenuation constant from the duration check unit 320, the attenuation constant look-up table 332 outputs an attenuation constant corresponding to the luminance level transmitted from the level detector 331. The attenuation constant look-up table 332 stores a plurality of attenuation constants and is configured to output an attenuation constant corresponding to a luminance level. In other words, the attenuation constant look-up table 332 stores attenuation constants such that an attenuation constant having a value allowing a luminance level to be lowered can be output when the luminance level received from the level detector 331 is high.

The level attenuation unit 340 includes a delay unit 341 and a multiplier 342 and attenuates the luminance level of the input RGB data. More specifically, the delay unit 341 delays the input RGB data while the motion detection unit 310, the duration check unit 320, and the attenuation constant generator 330 are processing the relevant pixel or block.

The multiplier 342 multiplies the RGB data transmitted from the delay unit 341 by the attenuation constant transmitted from the attenuation constant look-up table 332 and outputs the result data of multiplication. Accordingly, when data of the same pattern is output for more than a predetermined period of time, the luminance level of the data is attenuated according to the attenuation constant. However, when data of the same pattern is not output for more than the predetermined period of time, the RGB data output from the delay unit 341 is output as it is.

Figure 1:
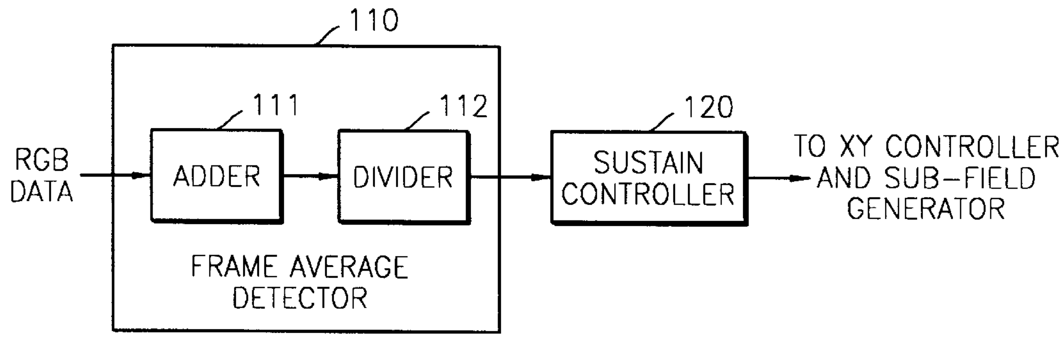
FIG. 1 (PRIOR ART)
FIG. 1 is a block diagram of a conventional apparatus for attenuating luminance in a plasma display panel (PDP)
Figure 2:
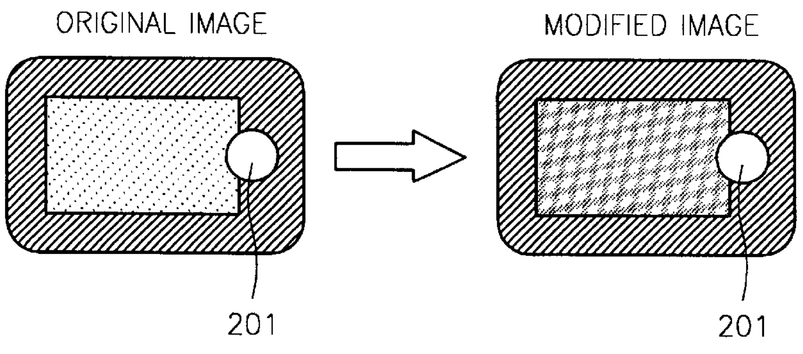
FIG. 2 (PRIOR ART)
FIG. 2 is a diagram of an example in which the luminance level of an image is changed by the apparatus shown in FIG. 1 when an average luminance level of a frame is low.

The output data is provided to a PDP driver (not shown) including an XY controller and a sub-field generator, as shown in FIG. 1.

Figure 4:
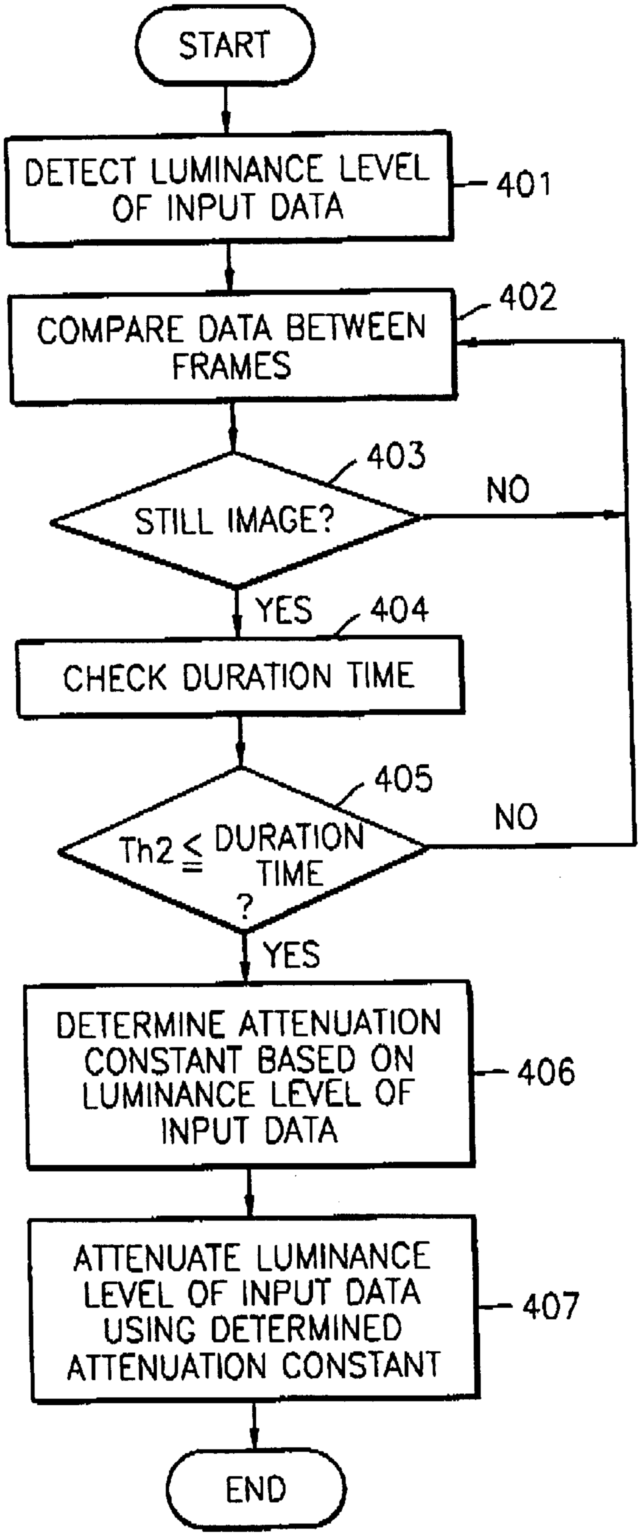
FIG. 4 is a flowchart of a method for attenuating luminance according to a preferred embodiment of the present invention.

FIG. 4 is a flowchart of a method for attenuating luminance according to a preferred embodiment of the present invention. Referring to FIG. 4, the luminance level of input RGB data having a linear characteristic is detected in step 401. The luminance level is detected in the same manner as conventionally used for detecting the luminance level of a video signal, as mentioned in the above description of the level detector 331 of FIG. 3. A previous frame and a current frame are compared in units of pixels or predetermined blocks. The predetermined block units have been described above in relation to the motion detection unit 310 of FIG. 3.

If it is determined that a current pixel or block image is not a still image based on the result of comparison in step 403, the procedure returns to step 402. In contrast, if it is determined that a current pixel or block image is a still image in step 403, a duration time is checked in step 404. In checking the duration time, if input data is newly determined as not a still image after a still image had been determined, the duration time is initialized.

If it is determined that the duration time is less than the threshold value Th2 in step 405, the procedure returns to step 402. However, if it is determined that the duration time is at least the threshold value Th2 in step 405, an attenuation constant is determined based on the luminance level of the input data, which is detected in step 401, in step 406. The attenuation constant is determined in the same manner as described in relation to the attenuation constant generator 330 of FIG. 3. The luminance level of the input data is attenuated using the determined attenuation constant in step 407. In other words, as described in relation to the level attenuation unit 340 of FIG. 3, the luminance level is attenuated by multiplying the input data by the determined attenuation constant.

Figure 5:
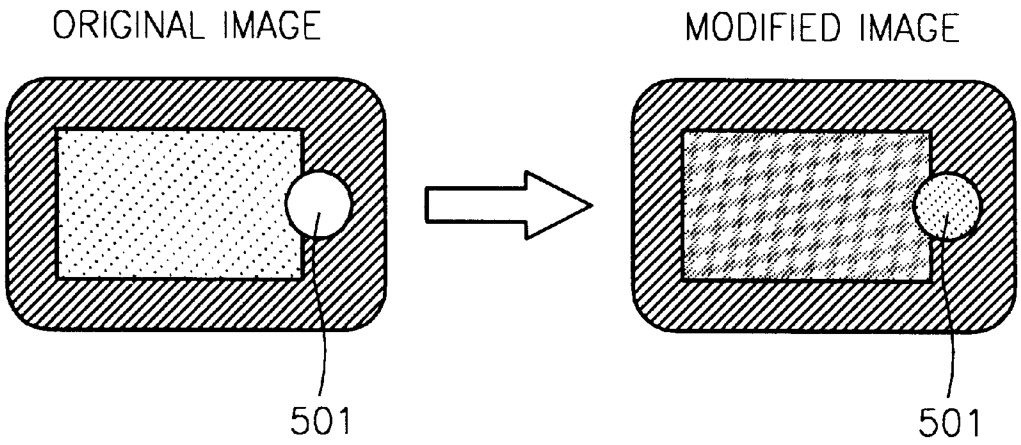
FIG. 5 is a diagram of an example in which the luminance level of an image is changed according to the present invention.

FIG. 5 is a diagram of an example in which the luminance level of an image is changed when it is adjusted as shown in FIGS. 3 and 4. A circular local area 501 is detected as a still image and is attenuated in a luminance level according to the present invention, so the luminance level of the local area 501 is lowered in a modified image, as shown in FIG. 5.

According to the present invention, degradation of picture quality on a local area, which does not influence an average luminance level for a frame, can be effectively prevented in a PDP, and an increase in power consumption can also be prevented.

The present invention is not restricted to the above-described preferred embodiments, and it will be understood by those skilled in the art that various changes may be made therein. Therefore, the scope of the invention will be defined not by the detailed description of the invention but by the appended claims.

What is claimed is:

1. An apparatus for attenuating luminance of a displayed image, comprising:

a motion detection unit for detecting whether input data has motion;

a duration check unit for checking a duration time for which the input data has no motion when the input data is detected as having no motion in the motion detection unit;

an attenuation constant generator for generating an attenuation constant corresponding to a luminance level of the input data when the input data continuously has no motion for at least a predetermined period of time; and a level attenuation unit for attenuating the luminance level of the input data using the attenuation constant generated from the attenuation constant generator.

2. The apparatus of claim 1, wherein the motion detection unit compares pixel unit data in a current frame with corresponding pixel unit data in a previous frame to detect motion for the input data.

3. The apparatus of claim 1, wherein the motion detection unit compares predetermined block unit data in a current frame with corresponding predetermined block unit data in a previous frame to detect motion for the input data.

4. The apparatus of claim 3, wherein the motion detection unit detects motion for the input data using an average luminance level with respect to each predetermined block unit.

5. The apparatus of claim 1, wherein the motion detection unit comprises:

a memory for storing the input data in units of frames;

an adder for detecting a difference between data provided from the memory and the input data; and a comparator for comparing the difference with a predetermined threshold value to detect whether the input data has motion.

6. The apparatus of claim 5, wherein when the difference is less than the predetermined threshold value, the comparator outputs a signal indicating that the input data has no motion.

7. The apparatus of claim 1, wherein the duration check unit comprises:

a timer which operates in response to a signal indicating the input data has no motion; and a comparator for comparing time information generated depending on the operation of the timer with a predetermined threshold value to determine whether the input data continuously has no motion for at least the predetermined period of time.

8. The apparatus of claim 1, wherein the attenuation constant generator comprises:

a level detector for detecting the luminance level of the input data; and a look-up table for storing a plurality of attenuation constants and providing an attenuation constant corresponding to the luminance level.

9. The apparatus of claim 1, wherein the level attenuation unit comprises:

a delay unit for delaying the input data; and a multiplier for multiplying the input data, which has been delayed by the delay unit, by the attenuation constant and outputting the data having an attenuated luminance level.

10. A method for attenuating luminance of a displayed image, comprising the steps of:

detecting a luminance level of input data;

comparing a previous frame with a current frame in units of pixels or predetermined blocks;

if a pixel unit or predetermined block unit image is determined as a still image, checking a duration time for which the pixel unit or predetermined block unit image is continued in a still image state;

if the duration time is at least a predetermined period of time, determining an attenuation constant corresponding to the luminance level of the input data; and attenuating the luminance level of the input data using the attenuation constant.

11. The method of claim 10, wherein the predetermined period of time is determined taking into account a period of time for which the still image is continued resulting in degradation of the luminance of the displayed image.

* * * * *